United States Patent
Lesartre et al.

(10) Patent No.: US 10,241,715 B2
(45) Date of Patent: Mar. 26, 2019

(54) RENDERING DATA INVALID IN A MEMORY ARRAY

(71) Applicant: HEWLETT PACKARD ENTERPRISE DEVELOPMENT LP, Houston, TX (US)

(72) Inventors: Gregg B. Lesartre, Fort Collins, CO (US); Siamak Tavallaei, Spring, TX (US); Russ W. Herrell, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 201 days.

(21) Appl. No.: 15/111,693

(22) PCT Filed: Jan. 31, 2014

(86) PCT No.: PCT/US2014/014165
§ 371 (c)(1),
(2) Date: Jul. 14, 2016

(87) PCT Pub. No.: WO2015/116168
PCT Pub. Date: Aug. 6, 2015

(65) Prior Publication Data
US 2018/0165036 A1 Jun. 14, 2018

(51) Int. Cl.
*G06F 12/00* (2006.01)
*G06F 3/06* (2006.01)
(Continued)

(52) U.S. Cl.
CPC .......... *G06F 3/0652* (2013.01); *G06F 3/0611* (2013.01); *G06F 3/0688* (2013.01);
(Continued)

(58) Field of Classification Search
CPC ....... G06F 3/0652; G06F 3/011; G06F 3/0688
See application file for complete search history.

(56) References Cited

U.S. PATENT DOCUMENTS 6,044,441 A * 3/2000 Malinowski ........ G06F 12/0802
711/144
7,899,958 B2   3/2011 Schroth
(Continued)

FOREIGN PATENT DOCUMENTS

CN    1320863       11/2001
KR    1020110104292  9/2011

OTHER PUBLICATIONS

International Searching Authority, The International Search Report and the Written Opinion, dated Oct. 27, 2014, 9 Pages.
Vasilios; "Instant Memory Cleaner"; Jan. 14, 2009; 7 pages.

*Primary Examiner* — Gurtej Bansal
(74) *Attorney, Agent, or Firm* — FabianVancott

(57) ABSTRACT

A method for rendering data invalid within a memory array is described. The method includes establishing governing metadata for a memory location within a memory array. The method also includes receiving a request to retrieve data from the memory location. The method also includes determining whether color metadata associated with the data matches the governing metadata. The method also includes returning the data when the color metadata matches the governing metadata. The method also includes returning invalidated data when the color metadata does not match the governing metadata.

20 Claims, 6 Drawing Sheets

(51) Int. Cl.
*G06F 17/30* (2006.01)
*G06F 12/02* (2006.01)

(52) U.S. Cl.
CPC .......... *G06F 12/0284* (2013.01); *G06F 17/30* (2013.01); *G06F 12/02* (2013.01)

(56) References Cited

U.S. PATENT DOCUMENTS

| | | |
|---|---|---|
| 7,913,147 B2 | 3/2011 | Swaminathan et al. |
| 8,255,887 B2 | 8/2012 | Heil |
| 8,615,517 B1 | 12/2013 | Vice et al. |
| 2005/0138296 A1* | 6/2005 | Coulson .................. G06F 1/263 711/141 |
| 2006/0136676 A1 | 6/2006 | Park et al. |
| 2009/0150646 A1 | 6/2009 | Allen et al. |
| 2010/0169282 A1 | 7/2010 | Atluri et al. |
| 2010/0306444 A1 | 12/2010 | Shirley et al. |
| 2012/0303868 A1* | 11/2012 | Tucek .................. G06F 12/0238 711/103 |
| 2013/0311741 A1 | 11/2013 | Tene et al. |

* cited by examiner

RENDERING DATA INVALID IN A MEMORY ARRAY

BACKGROUND

Memory arrays are used to store data. In some examples different applications may have access to a memory array. For example, a first application may read and write data to a memory array during one period of time and a second application may read and write data to the memory array during another period of time. An application may be any entity, computing device, program, among other applications that may have access to a memory array at some point in time.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
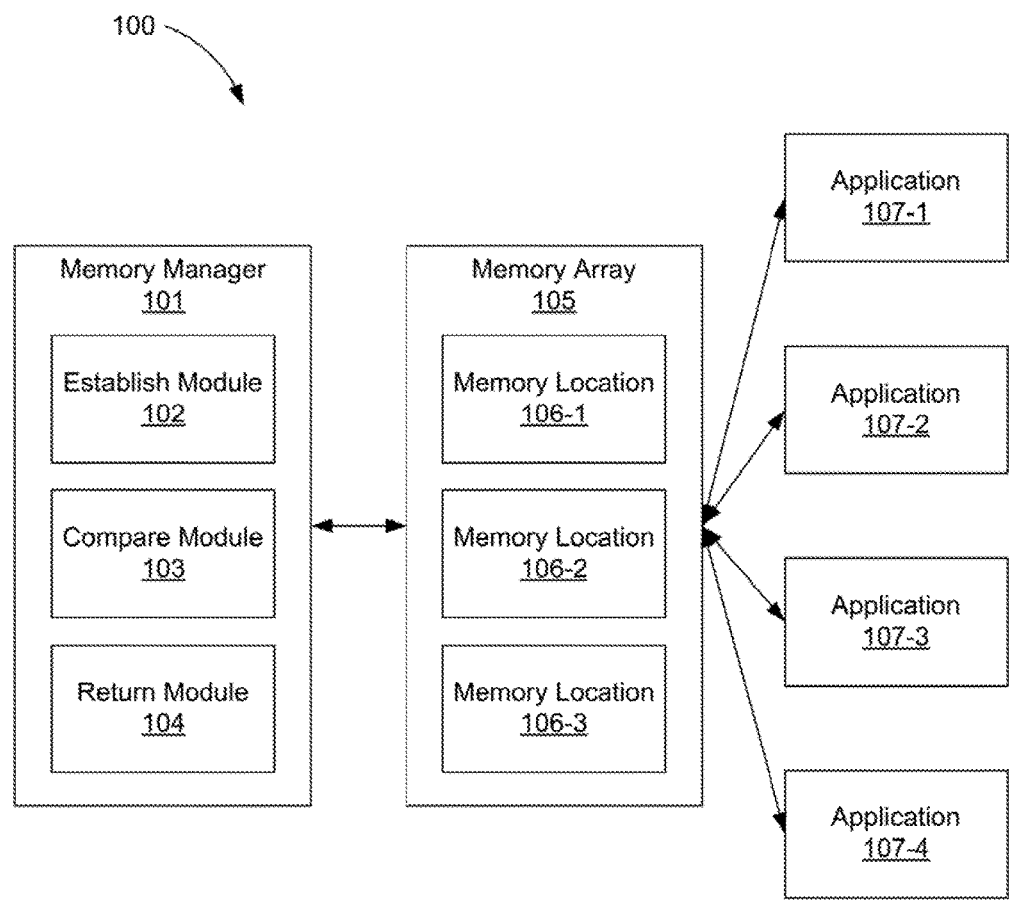
FIG. 1 is a diagram of a system for rendering data invalid in a memory array according to one example of the principles described herein.

Memory arrays may be used to store data. Memory arrays may be accessed by different applications at various points in time. For example, one program may have access to read and write to a first memory array for a given period of time and another program may have access to read and write to the first memory array for another period of time. In another example, one virtual machine may have access to read and write to the first memory array for a given period of time and another virtual machine may have access to read and write to the first memory array for another period of time. In other words, a pool of memory arrays may be used to service a number of applications. Doing so may be beneficial by reducing the overall number of memory arrays used to facilitate a given number of applications. However, such a pooling system may have certain inefficiencies.

For example, the increasing capacity of memory arrays that allow data to persist across machine reboot and across power cycles may impose a challenge for systems to invalidate memory quickly such that it may be reused by the same application for a different purpose or such that it may be used by another application. For example, between each use, the memory arrays are wiped clean to ensure security and privacy of the data previously stored and to ensure proper use of the memory array going forward. Accordingly, some systems may walk through a number of memory locations that are to be re-allocated to another application and wipe clean each memory location. During such a walk through, the data within each memory location may be explicitly written to a cleared value. However, such methods may be inefficient, may consume excessive amounts of power, and make take a long time to complete.

For example, a complete walk through of the entire memory array may render the memory array unavailable until each individual location within the memory array has been cleansed. While a walk through may be accelerated, the memory array and other components such as common interfaces, channels, controllers, caches, queues, and pathways are still unavailable during the walk through.

Accordingly, the present disclosure describes systems and methods for effectively clearing a memory location in a single operation such that it is more readily available for reuse. Old data that was stored in the memory location will be rendered unobservable, and new data may be retained even as a full patrol scrub of the data is handled in the background. In other words, the present disclosure may allow data in a memory array to be instantly invalidated, and made available for reuse without delay. In some examples, a patrol scrubber may then clean out the discarded data in the background.

The present disclosure describes a method for rendering data invalid within a memory array. The method may include establishing governing metadata for a memory location within a memory array. The method may also include receiving a request to retrieve data from the memory location. The method may also include determining whether the color metadata associated with the data matches the governing metadata. The method may also include returning the data when the color metadata matches the governing metadata. The method may also include returning invalidated data when the color metadata does not match the governing metadata.

The present disclosure describes a system for rendering data invalid within a memory array. The system may include a processor and memory which is communicatively coupled to the processor. The method may also include a memory manager. The memory manager may include an establish module to establish governing metadata for a number of memory locations within a memory array. The memory manager may also include a compare module to compare color metadata associated with data stored in the memory locations to the governing metadata. The memory manager may also include a return module to return invalidated data whose color metadata is different from the governing metadata.

The present disclosure describes a computer program product for rendering data invalid within a memory array. The computer program product may include a computer readable storage medium comprising computer usable program code embodied therewith. The computer usable program code may include computer usable program code to, when executed by a processor, establish governing metadata for a memory location within a memory array. The computer usable program code may also include computer usable program code to, when executed by a processor, compare color metadata associated with data stored in the memory locations to the governing metadata. The computer usable program code may also include computer usable program code to, when executed by a processor, invalidate data whose color metadata is different from the governing metadata. The computer usable program code may also include computer usable program code to, when executed by a processor, walk through a number of memory locations within the memory array. The computer usable program code may also include computer usable program code to, when executed by a processor, invalidate data stored in memory locations whose color metadata is different from the governing metadata.

The systems and methods described herein may be beneficial in that they allow memory to be immediately available when redeployed. Moreover, prior data is protected and proper functioning of future memory use is ensured.

As used in the present specification and in the appended claims, the term "governing metadata" may refer to metadata that is associated with a memory location and is stored in the memory location.

Further, as used in the present specification and in the appended claims, the term "color metadata" may refer to metadata that is associated with data stored in a memory location. As will be described below, the governing metadata and the color metadata may be compared to determine whether data corresponding to the color metadata is to be invalidated.

Still further, as used in the present specification and in the appended claims, the term "application" may refer to programs, entities, computing devices, computing systems, among other applications, that may access memory arrays.

Still further, as used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of a system (100) for rendering data invalid in a memory array (105) according to one example of the principles described herein. In some examples, the system (100) may be utilized within a single computing device. In this scenario, a single computing device may utilize the memory manager (101) and other associated modules to carry out the functionality described herein.

The system (100) may include a number of memory arrays (105). A memory array (105) may be used to store data. In some examples, the memory array (105) may be a non-volatile memory array (105). A non-volatile memory array (105) may be a memory array (105) in which data persists even though power may be removed from the memory array (105). For example, data may be stored in the non-volatile memory array (105). Power may then be removed from the memory array (105). The data stored may again be accessed from the non-volatile memory array (105) once power is restored. The memory array (105) may be a volatile memory array (105). Volatile memory may refer to memory that does not maintain data in the event of a power loss. For example, once power is removed from a volatile memory array (105), the data stored therein may be lost.

A memory array (105) may include a number of memory locations (106) that store data. Each memory location (106) may include a number of memory bits that are used to store data. Each memory bit within a memory location (106) may be set to a "value" such as a 0 or a 1 to indicate stored data.

For example, the bits within a memory location (106) may reference data stored therein according to the values (i.e., 0, 1, or combinations thereof) of the various memory bits. While FIG. 1 indicates three memory locations (106-1, 106-2, 106-3) a memory array may include any number of memory locations (106).

Various applications (107) may have access to the memory array (105). More specifically, the various applications (107) may read data from, and write data to, the various memory locations (106) at different times, or concurrently. For example, the first application (107-1) may read data from, and write data to, the first memory location (106-1). The second application (107-2) may read data from, and write data to, the second memory location (106-2). In some examples, a memory location (106) may be re-deployed to another application (107). For example, the first application (107-1) may read data from, and write data to, the first memory location (106-1) for a first period of time. Subsequently, the second application (107-2) may read data from, and write data to, the first memory location (106-1) for a second, and distinct, period of time.

As used in the present specification, an application (107) may refer to any entity, computing program, computing device, computing system, or other application (107) that may have access to the memory array (105). For example, an application (107) may be a program running on a computing device. An application (107) may also be a program running on a different computing device. In yet another example, an application (107) may be a different user, logged in at a computing device. Still further, an application (107) may be a virtual machine that accesses the memory array (105). While FIG. 1 depicts four applications (107-1, 107-2, 107-3, 107-4), any number of application (107) may access a memory array (105).

The system (100) may also include a memory manager (101) to manage the memory array (105). Generally, the memory manager (101) may comprise a computer readable medium, a computer readable storage medium, or a non-transitory computer readable medium, among others. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The memory manager (101) may include a number of modules to invalidate data within a memory array (105). Specifically, the memory manager (101) may include an establish module (102) that establishes governing metadata for a number of memory locations (106) within a memory array (105). Governing metadata may be metadata that pertains to, and indicates a state of, the memory location (106). The "state" of the memory location (106) may indicate which application(s) (107) have access to the memory location (106). The governing metadata may be any number of bits set to predetermined values. Different value of the bits may indicate a different state of the memory location (106). In some examples, the governing metadata may be stored in a non-volatile memory such that it will persist across any power cycle.

Any time data is written to the memory location (106), the governing metadata is written to the color metadata associated with the data. In other words, the governing metadata may be metadata associated with the memory location (106) and the color metadata may be the same metadata that is associated with the data. In some examples, the governing metadata may be the same for memory locations (106) within a memory array (105). For example, each of the memory locations (106-1, 106-2, 106-3) may have the same governing metadata. By comparison, the governing metadata may be different for each memory location (106) within a memory array (105). For example, each of the memory locations (106-1, 106-2, 106-3c) may have different governing metadata.

Governing metadata may be used to determine whether data within a memory location (106) should be invalidated. For example, the governing metadata for a memory location (106) may be compared to color metadata that corresponds to data within the memory location (106). If the governing metadata is the same as the color metadata, the data is valid. By comparison, if the governing metadata is different from the color metadata, the data is invalid. In some examples, data within the memory locations (106) may be invalidated by a single operation of changing the governing metadata. For example, if all data within a memory location (106) is valid, i.e., it's color metadata matches the governing metadata, the data may be invalidated by flipping a governing metadata bit and thereby rendering the corresponding color metadata in memory locations (106) different from the governing metadata bit.

The compare module (103) may compare color metadata associated with data stored in a memory location (106) to the governing metadata. Color metadata may be metadata that pertains to, and indicates a state of the data within a memory location (106). The color metadata may be any number of bits set to predetermined values. For example, a single bit may be stored with each piece of data. In some examples, the color metadata bit may be included with other metadata such as error correction code bits, or directory bits. Different values of the bits may indicate a different state of the data within a memory location (106).

The color metadata may be used to determine whether data within a memory location (106) should be invalidated, whether invalidated data should be returned, or combinations thereof. For example, the compare module (103) may compare the governing metadata to the color metadata. If the color metadata is the same as the governing metadata, the data may be valid. By comparison, if the color metadata is different from the governing metadata, the data is invalid.

The return module (104) may return invalidated data whose color metadata is different from the governing metadata. As used herein, invalidated data may refer to data whose bit values are set to zero or any other pattern that is distinct from the original data. By comparison, the return module (104) may return the data when the color metadata matches the governing metadata.

The memory manager (101) as described herein may be beneficial in that it allows for quick indication of invalid memory by comparing governing metadata associated with a memory location (106) and color metadata associated with the data stored in the memory location (106). Similarly, it allows a memory location (106) to be redeployed to another application (107) with the assurance that previously stored data has been properly cleaned and protected.

Figure 2:
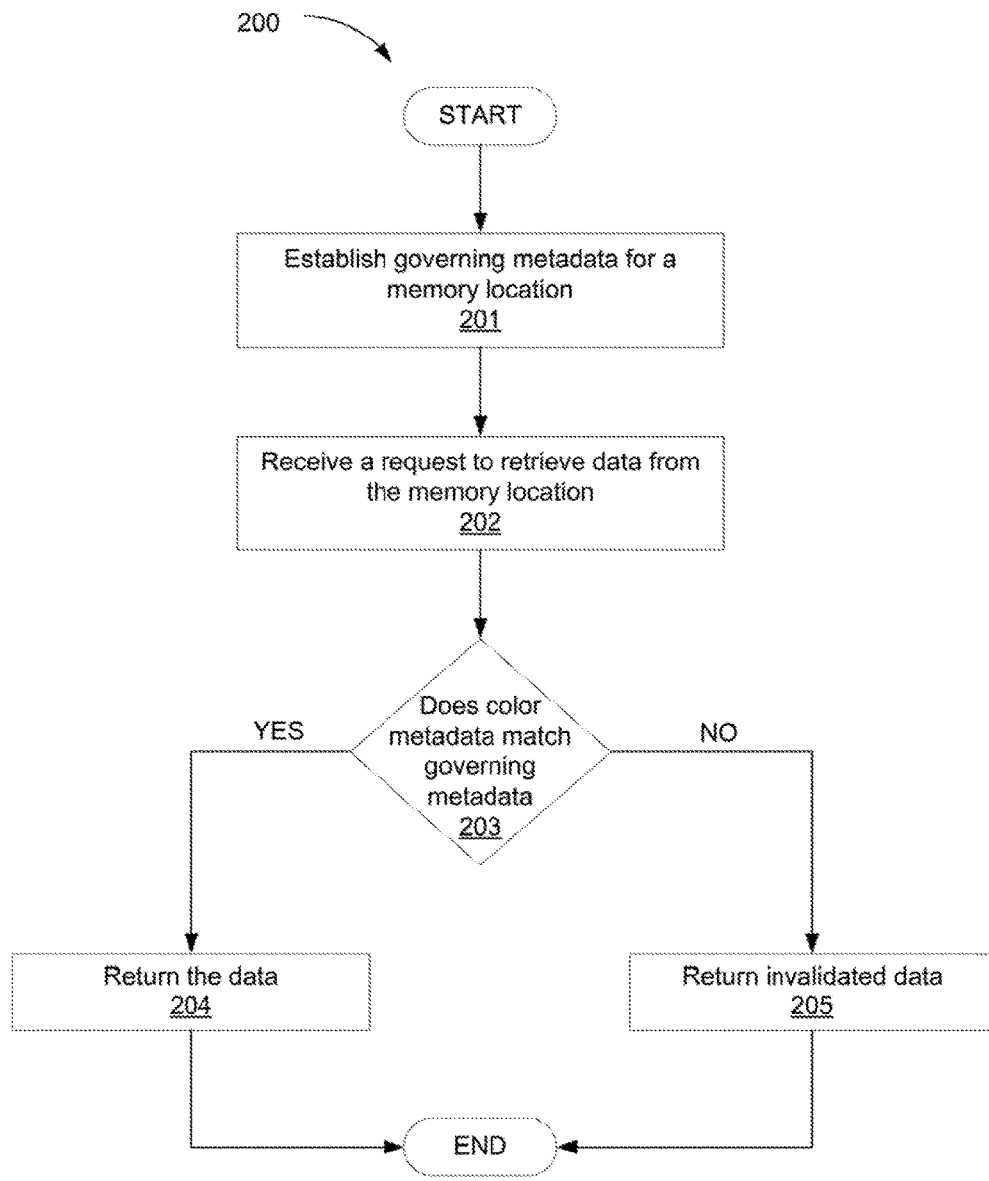
FIG. 2 is a flowchart of a method for rendering data invalid in a memory array according to one example of the principles described herein.

FIG. 2 is a flowchart of a method (200) for rendering data invalid in a memory array (FIG. 1, 105) according to one example of the principles described herein. The method (200) may include establishing (block 201) governing metadata for a memory location (FIG. 1, 106). As described above, governing metadata may be any number of bits of metadata that indicates a state of the memory location (FIG. 1, 106). For example, the governing metadata may indicate that a memory location (FIG. 1, 106) is in a particular "cycle" of read and writes. More specifically, the governing metadata may indicate that the memory location (FIG. 1, 106) is in a cycle in which it is being used by a particular application (FIG. 1, 107). The number of bits used as the governing metadata may indicate a number of states that may be represented by the governing metadata. For example, if a single bit is used as the governing metadata, two states of the memory location (FIG. 1, 106) may be represented by the governing metadata. Establishing (block 201) governing metadata may include setting metadata bit values to a predetermined value.

The method (200) may include receiving (block 202) a request to retrieve data from the memory location (FIG. 1, 106). For example, a particular application (FIG. 1, 107) may request data from a memory location (FIG. 1, 106). The method (200) may include determining (block 203) whether the color metadata corresponding to the requested data matches the governing metadata. This may include comparing the bits of the color metadata with the corresponding bits of the governing metadata.

If the color metadata matches the governing metadata (block 203, determination YES), the method (200) may include returning (block 204) the data to the requestor application (FIG. 1, 107). By comparison, if the color metadata does not match the governing metadata (block 203, determination NO), invalidated data may be returned (block 205) to the requestor application (FIG. 1, 107). As described above, invalidated data may include a number of zeroes. While specific reference is made to invalidated data being a number of zeroes, invalidated data may be any pattern of data that is not the original data. A determination that the color metadata does not match the governing metadata (block 203, determination NO) may indicate that the data stored in the memory location (FIG. 1, 106) does not correspond to the current cycle, or state, of the memory location (FIG. 1, 106). For example, color metadata that does not match the governing metadata may indicate that the governing metadata has been updated corresponding to a redeployment of the memory location (FIG. 1, 106).

Figure 3:
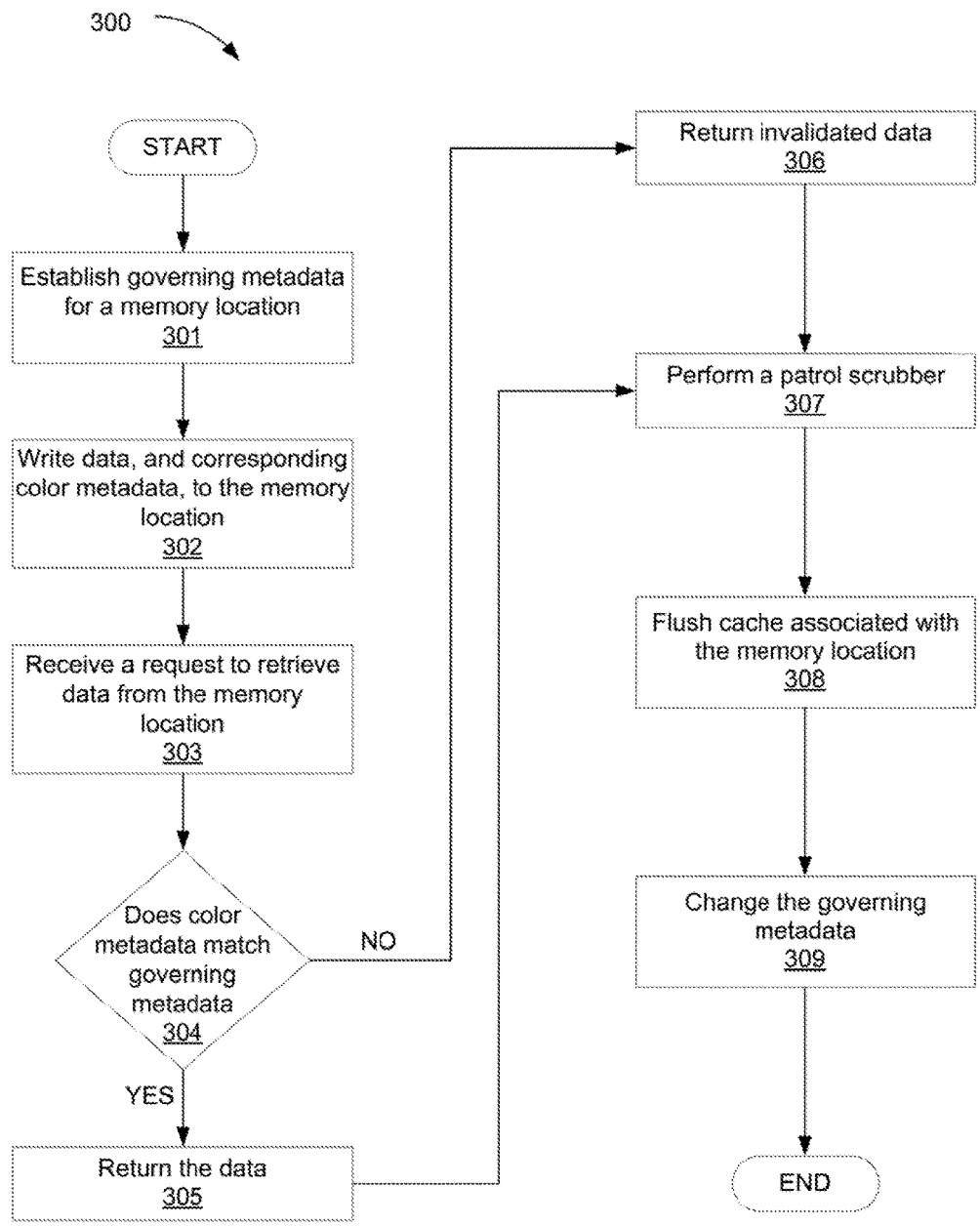
FIG. 3 is a flowchart of another method for rendering data invalid in a memory array according to one example of the principles described herein.

FIG. 3 is a flowchart of another method (300) for rendering data invalid in a memory array (FIG. 1, 105) according to one example of the principles described herein. The method (300) may include establishing (block 301) governing metadata for a memory location (FIG. 1, 106). This may be performed as described in connection with FIG. 2.

The method (300) may include writing (block 302) data, and corresponding color metadata, to the memory location (FIG. 1, 106). In this example, the color metadata that is written to the memory location (FIG. 1, 106) may be the same as the governing metadata. As described above, color metadata associated with data in a memory location (FIG. 1, 106) may be used to validate the data. Accordingly, each time data is written to the memory location (FIG. 1, 106); color metadata corresponding to the data is also written to the memory location (FIG. 1, 106). The color metadata that is written to the memory location (FIG. 1, 106) may match the governing metadata that was established (block 301). Accordingly, because the color metadata matches the governing metadata, the written data is initially valid. A request to retrieve data from the memory location (FIG. 1, 106) is then received (block 303). This may be performed as described in connection with FIG. 2.

The memory manager (FIG. 1, 101) may determine (block 304) whether the color metadata matches the governing metadata. This may be performed as described in connection with FIG. 2. If the color metadata matches the governing metadata (block 304, determination YES), the data requested may be returned (block 305). This may be performed as described in connection with FIG. 2. By comparison, if the color metadata does not match the governing metadata (block 304, determination NO), invalidated data, such as zeroes or another unrecognizable data pattern, may be returned (block 306). This may be performed as described in connection with FIG. 2.

In some examples, a patrol scrubber may be performed (block 307). In general, a patrol scrubber walks through each memory location (FIG. 1, 106) within a memory array (FIG. 1, 105) checking data within each memory location (FIG. 1, 106) to determine if it has a valid error correction code. If it does not, a correction code may be implemented to fix the data. In some examples, a patrol scrubber may be performed (block 307) to walk through memory locations (FIG. 1, 106) within a memory array (FIG. 1, 105) comparing the color metadata for the data to the governing metadata for the memory locations (FIG. 1, 106). If color metadata for data does not match the governing metadata for a particular memory location (FIG. 1, 106), the patrol scrubber may explicitly write zeroes to the memory location (FIG. 1, 106) as well as new color metadata to match the governing metadata. By comparison, if the color metadata for data does match the governing metadata for a particular memory location (FIG. 1, 106) the color metadata, and corresponding data may be left untouched. Accordingly, after a patrol scrubber all color metadata may match the governing metadata. Performing (block 307) a patrol scrubber may be beneficial in that it allows for a complete processing of all memory locations (FIG. 1, 106) within a memory array (FIG. 1, 105) to ensure data is wiped between uses by different applications (FIG. 1, 107).

The method (300) may also include flushing (block 308) memory cache associated with the memory location (FIG. 1, 106). For example, in addition to a memory location (FIG. 1, 106), memory cache may be accessed by an application (FIG. 1, 107) to temporarily store data that is to be sent to the memory location (FIG. 1, 106). To ensure data security, the memory cache may also be invalidated along with a memory location (FIG. 1, 106).

As described above, in some examples, data within a memory location (FIG. 1, 106) may be invalidated by a single operation. For example, the governing metadata may be changed (block 309). Doing so may render previously matching color data to not match with the governing metadata. Once a governing metadata is changed (block 309), the corresponding memory location (FIG. 1, 106) may be reallocated to a different application (FIG. 1, 107). For example, a memory location (FIG. 1, 106) may be immediately reusable by a virtual machine on a system. In some examples, the cache may be flushed (block 308) before changing (block 309) the governing metadata. In other examples, the cache may be flushed (block 308) after changing (block 309) the governing metadata. For example, if the color metadata is updated after changing (block 309) the governing metadata, a patrol scrubber may identify updated color metadata that matches the updated governing metadata. In this example, a memory cache associated with the memory location that includes updated color metadata that does not match the updated governing metadata, may be flushed (block 309).

Figure 4:
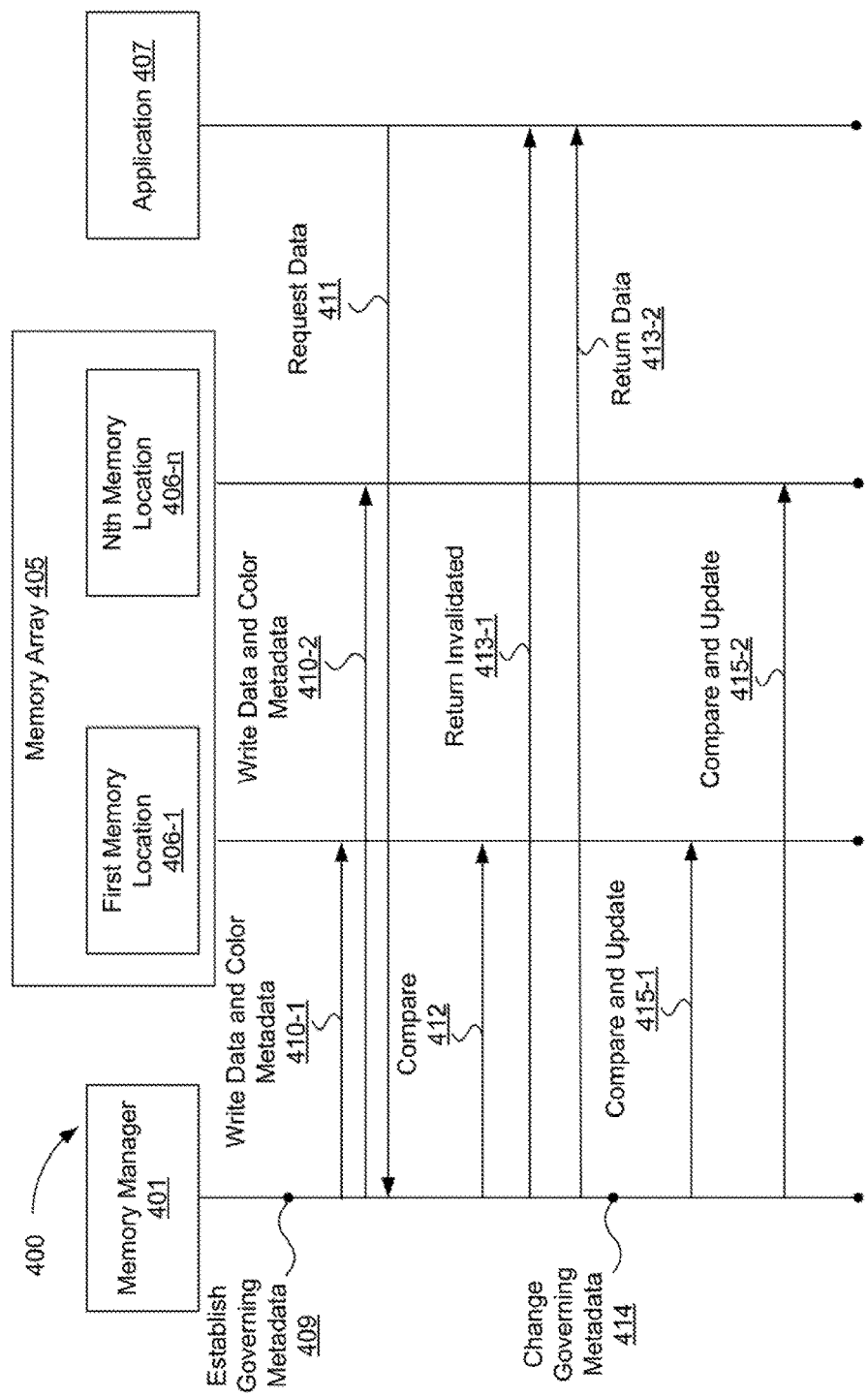
FIG. 4 is a thread diagram illustrating invalidation of data in a memory array according to one example of the principles described herein.

FIG. 4 is a thread diagram (400) illustrating invalidation of data in a memory array (405) according to one example of the principles described herein. The memory manager (401) may establish (409) governing metadata for a number of memory locations (FIG. 1, 106). The governing metadata may be similar to, or distinct between, memory locations (406) of a memory array (405). Establishing (409) governing metadata may include setting metadata bit values to a predetermined value or pattern.

The memory manager (401) may write (410) data and color metadata to the memory locations (406). For example, the memory manager (401) may write (410-1) data and color metadata to the first memory location (406-1). Initially, the color metadata written may be the same as the governing metadata that is established (409). Similarly, the memory manager (401) may write (410-2) data and color metadata to the other memory locations, up to and including, an nth memory location (406-n). The color metadata that is initially written to the memory locations (406) may match the established governing metadata.

An application (407) may request (411) data from a memory location (406). For example, the application (407) may request (411) data stored on the first memory location (406-1). In response, the memory manager (401) may compare (412) the color metadata for the requested data with the governing metadata for the first memory location (406-1). If the color metadata for the requested data and the governing metadata for the first memory location (406-1) do not match, the memory manager (401) may return (413-1) invalidated data. By comparison, if the color metadata for the requested data and the governing metadata for the first location (406-1) do match, the memory manager (401) may return (413-2) the requested data.

The memory manager (401) may change (414) the governing metadata. Changing (414) the governing metadata may indicate a change in state of a memory location (406), or may indicate a change in which application (407) that may access a particular memory location (406).

As described above, in some examples, a patrol scrubber may walk through each memory location (406) to write invalidated data to a memory location, and to update the color metadata. Accordingly, the memory manager (401) may compare (415-1) the color metadata for data in the first memory location (406-1) with the updated governing metadata. If they are different, the memory manager (401) may write invalidated data to the first memory location (406-1). The memory manager (401) may also write updated color metadata, that matches the updated governing metadata, to the first memory location (406-1). Similarly, the memory manager (401) may compare (415-2) the color metadata for data in the other memory locations (406-n) with the updated governing metadata. If they are different, the memory manager (401) may write invalidated data to the other memory locations (406-n). The memory manager (401) may also write updated color metadata, that matches the updated governing metadata, to the other memory locations (406-n).

While FIG. 4 depicts the governing metadata being changed (414) prior to a patrol scrub of the memory locations (406) within a memory array (405), the governing metadata may be changed (414) at any point. For example, the patrol scrub may occur prior to a change of the governing metadata. Similarly, while the patrol scrub (415) is depicted as occurring after a return (413) of invalidated or valid data, the patrol scrub may occur concurrently with other operations. In some examples, the memory manager (401) may implement an accelerated patrol scrub to compare color metadata to governing metadata.

Figure 5:
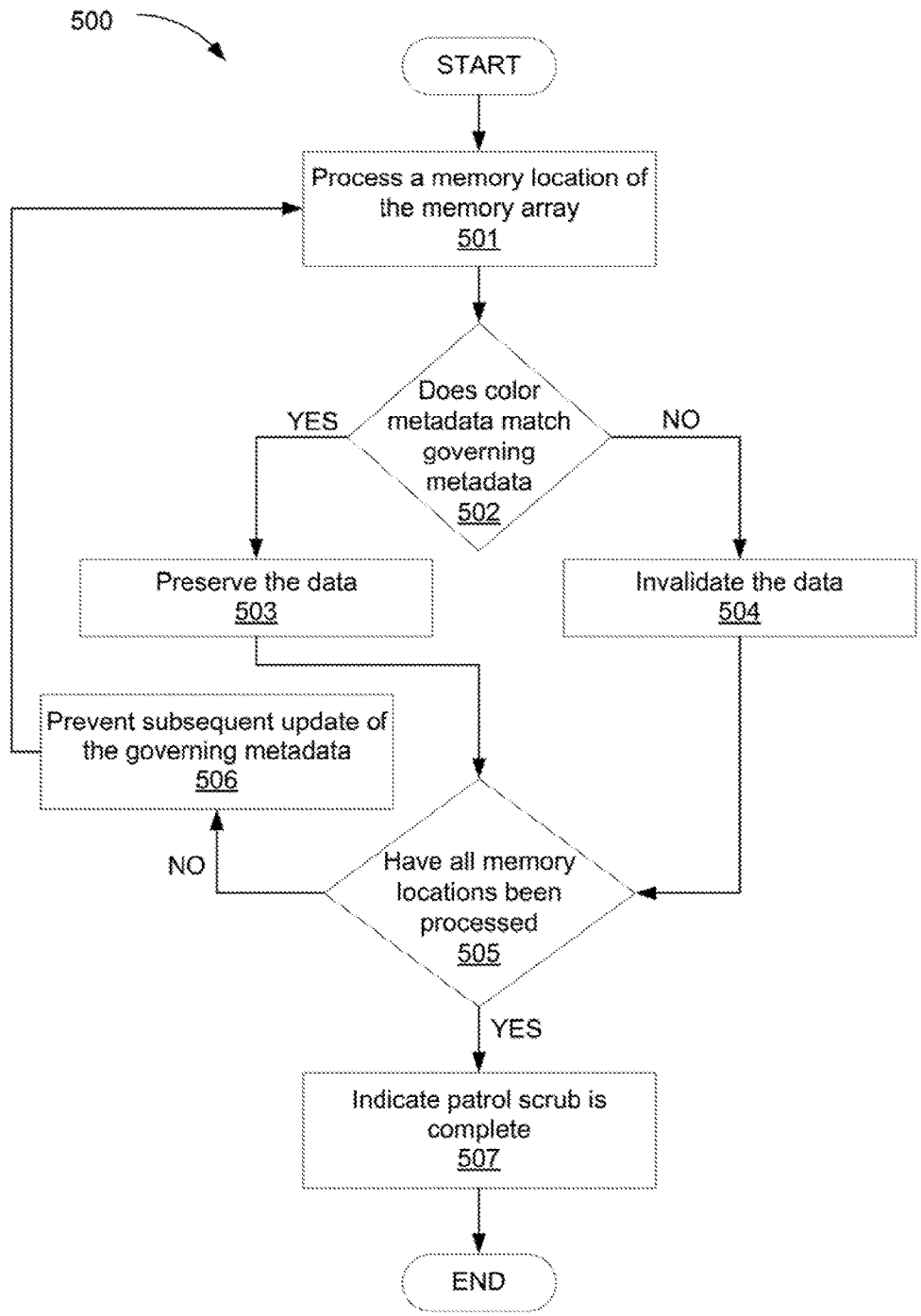
FIG. 5 is a flowchart of a method for patrol scrubbing a memory array according to one example of the principles described herein.

FIG. 5 is a flowchart of a method (500) for patrol scrubbing a memory array (FIG. 1, 105) according to one example of the principles described herein. As described above, in some examples a patrol scrubber may be used to walk through a number of memory locations (FIG. 1, 106)

within a memory array (FIG. 1, 105) to compare the color metadata with the governing metadata. More specifically, the method (500) may include processing (block 501) a memory location (FIG. 1, 106) of the memory array (FIG. 1, 105). For example, the memory manager (FIG. 1, 101) may determine (block 502) whether color metadata for data within the memory location (FIG. 1, 106) matches the governing metadata. This may be performed as described in connection with FIG. 2.

If the color metadata matches the governing metadata (block 502) determination YES), the memory manager (FIG. 1, 101) may preserve (block 503) the data. In other words, the data whose color metadata matches the governing metadata may be left untouched. By comparison, if the color metadata does not match the governing metadata (block 502, determination NO), the memory manager (FIG. 1, 101) may invalidate (block 504) the data. Invalidating (block 504) the data may include writing zeroes to the memory location (FIG. 1, 106) or writing any other pattern that is distinct from the original data.

The memory manager (FIG. 1, 101) may then determine (block 505) if all memory locations (FIG. 1, 106) have been processed. If not all memory locations (FIG. 1, 106) have been processed (block 505, determination NO), the memory manager (FIG. 1, 101) may return to processing (block 501) another memory location (FIG. 1, 106) within a memory array (FIG. 1, 105). Along the way, the memory manager (FIG. 1, 101) may prevent (block 506) a subsequent update of the governing metadata. In some examples, the memory manager (FIG. 1, 101) may prevent a subsequent update of the governing metadata if a patrol scrub has not been completed unless a new value of the governing metadata was used. In other words, the memory manager (FIG. 1, 101) may prevent (block 506) an update of the governing metadata until pending patrol scrubbing operations are complete. Determining whether all memory locations have been processed may be beneficial in that a systematic approach is used to cleanse each memory location (FIG. 1, 106) within a memory array (FIG. 1, 105). Doing so may also ensure that previously stored data is inaccessible by a subsequent application (FIG. 1, 107) and may ensure clean memory for future reading and writing operations.

If all memory locations (FIG. 1, 106) have been processed (block 505, determination YES), the memory manager (FIG. 1, 101) may indicate (block 507) that a patrol scrub is complete. Doing so may allow a user to determine that a memory array (FIG. 1, 105) is clean, for example for a subsequent removal or other disposal of a memory array (FIG. 1, 105).

Figure 6:
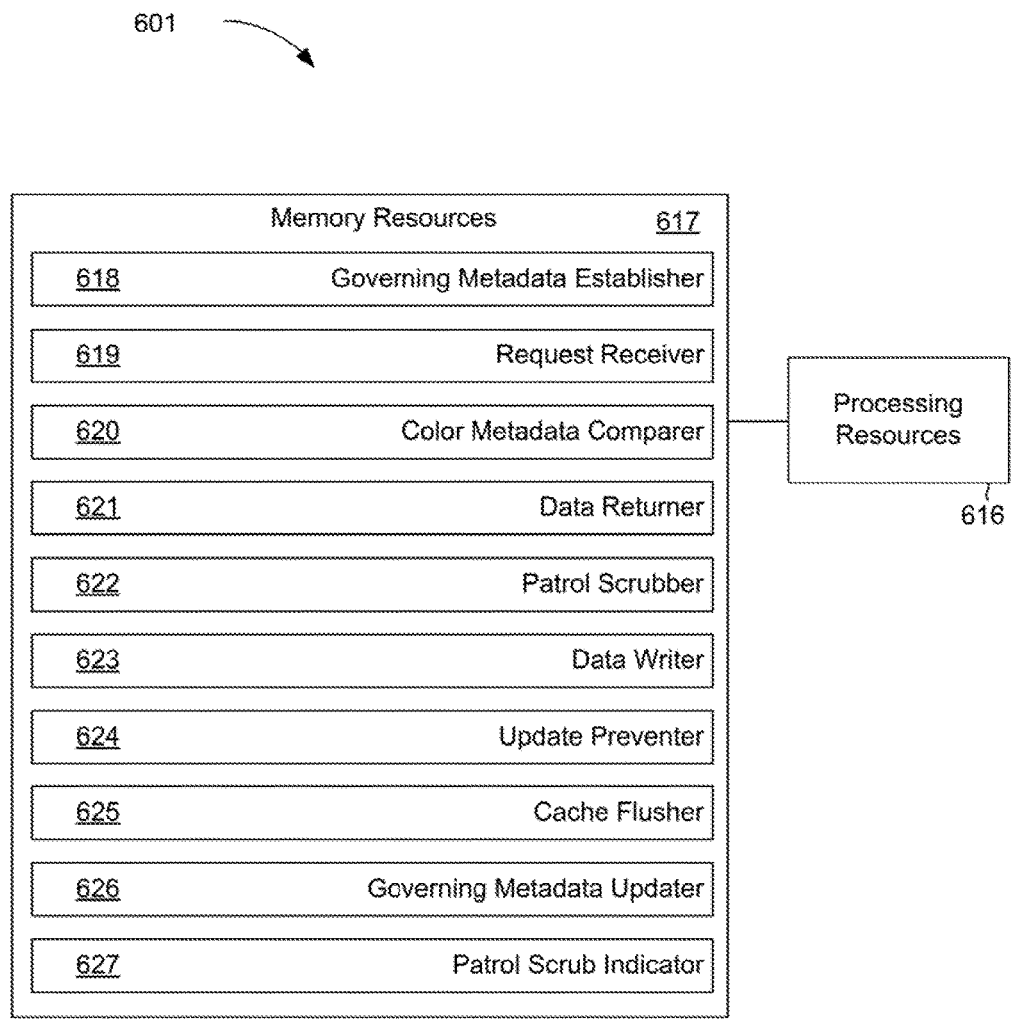
FIG. 6 is a diagram of a memory manager for rendering data invalid within a memory array according to one example of the principles described herein.

FIG. 6 is a diagram of a memory manager (601) for rendering data invalid within a memory array (FIG. 1, 105) according to one example of the principles described herein. In this example, memory manager (601) includes processing resources (616) that are in communication with memory resources (617). Processing resources (616) include at least one processor and other resources used to process programmed instructions. The processor may include the hardware architecture to retrieve executable code from the memory manager (601) and execute the executable code. The executable code may, when executed by the processing resources (616), cause the processing resources (616) to implement at least the functionality of rendering data invalid in a memory array, according to the methods of the present specification described herein. In the course of executing code, the processing resources (616) may receive input from and provide output to a number of the remaining hardware units.

The memory resources (617) represent generally any memory capable of storing data such as programmed instructions or data structures used by the memory manager (601). The memory resources (617) may store data such as executable program code that is executed by the processing resources (616) or other processing device. As will be discussed, the memory manager (601) may specifically store a number of applications that the processing resources (616) executes to implement at least the functionality described herein.

The programmed instructions shown stored in the memory resources (617) include a governing metadata establisher (618), a request receiver (619), a color metadata comparer (620), a data returner (621), a patrol scrubber (622), a data writer (623), an update preventer (624), a cache flusher (625), a governing metadata updater (626), and a patrol scrub indicator (627).

The memory resources (617) include a computer readable storage medium that contains computer readable program code to cause tasks to be executed by the processing resources (616). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The governing metadata establisher (618) represents programmed instructions that, when executed, cause the processing resources (616) to establish governing metadata for a memory location (FIG. 1, 106) within a memory array (FIG. 1, 105). The governing metadata establisher (618) may be implemented by the establish module (FIG. 1, 102). The request receiver (619) represents programmed instructions that, when executed, cause the processing resources (616) to receive a request to retrieve data from the memory location (FIG. 1, 106). The color metadata comparer (620) represents programmed instructions that, when executed, cause the processing resources (616) to determine whether the color metadata associated with the data matches the governing metadata associated with the memory location (FIG. 1, 106). The color metadata comparer (620) may be implemented by the compare module (FIG. 1, 103). The data returner (621) represents programmed instructions that, when executed, cause the processing resources (616) to return data when the color metadata matches the governing metadata and to return invalidated data when the color metadata does not match the governing metadata.

The patrol scrubber (622) represents programmed instructions that, when executed, cause the processing resources (616) to walk through a number of memory locations (FIG. 1, 106) within the memory array (FIG. 1, 105). The data writer (623) represents programmed instructions that, when executed, cause the processing resources (616) to write invalidated data, updated color metadata, or combinations thereof to memory locations (FIG. 1, 106) that include data whose color metadata is different from the governing metadata.

The update preventer (624) represents programmed instructions that, when executed, cause the processing resources (616) to prevent an update of the governing metadata. The cache flusher (625) represents programmed instructions that, when executed, cause the processing resources (616) to flush memory cache associated with the memory location (FIG. 1, 106). The governing metadata updater (626) represents programmed instructions that, when executed, cause the processing resources (616) to update the governing metadata to invalidate a number of memory locations (FIG. 1, 106). The patrol scrub indicator (627) represents programmed instructions that, when executed, cause the processing resources (616) to indicate when a patrol scrub is completed.

Further, the memory resources (617) may be part of an installation package. In response to installing the installation package, the programmed instructions of the memory resources (617) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (616) and the memory resources (617) are located within the same physical component, such as a server, or a network component. The memory resources (617) may be part of the physical component's main memory, caches, registers, non-volatile memory, or elsewhere in the physical component's memory hierarchy. Alternatively, the memory resources (617) may be in communication with the processing resources (616) over a network. Further, the data structures, such as the libraries, may be accessed from a remote location over a network connection while the programmed instructions are located locally. Thus, the memory manager (601) may be implemented on a user device, on a server, on a collection of servers, or combinations thereof.

The memory manager (601) of FIG. 6 may be part of a general purpose computer. However, in alternative examples, the memory manager (601) is part of an application specific integrated circuit.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor resources (616) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Methods and systems for rendering data invalid within a memory array (FIG. 1, 105) may have a number of advantages, including: (1) making memory immediately available upon redeployment; (2) protecting previous data by ensuring it is wiped from a memory array (FIG. 1, 105); (3) pre-zeroing the data to alleviate the need for other zeroing procedures; and (4) invalidating data in a redundant array of inexpensive disks (RAID) set.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for rendering data invalid within a memory array, comprising:
   establishing governing metadata for a memory location within a memory array;
   receiving a request to retrieve data from the memory location;
   determining whether color metadata associated with the data matches the governing metadata;
   returning the data when the color metadata matches the governing metadata;
   returning invalidated data when the color metadata does not match the governing metadata; and
   patrol scrubbing the memory array by:
      walking through a number of memory locations within the memory array,
      comparing color metadata associated with data stored in the memory locations to the governing metadata, and
      writing invalidated data, updated color metadata, or combinations thereof to memory locations that include data whose color metadata is different from the governing metadata, wherein the updated color metadata matches the governing metadata.

2. The method of claim 1, in which the invalidated data comprises a string of zeroes.

3. The method of claim 1, further comprising flushing memory cache associated with the memory location.

4. The method of claim 1, further comprising writing the data and the color metadata to the memory location in a first instance, wherein the color metadata is initially the same as the governing metadata.

5. The method of claim 1, further comprising reallocating a memory location for which governing metadata is changed to a different application.

6. The method of claim 1, further comprising indicating when a patrol scrub is completed.

7. The method of claim 6, further comprising preventing an update of the governing metadata until pending patrol scrubbing operations are complete.

8. A system for rendering data invalid within a memory array, comprising:
   a processor;
   memory communicatively coupled to the processor; and
   a memory manager to:
      establish governing metadata for a number of memory locations within a memory array,
      compare color metadata associated with data stored in the memory locations to the governing metadata,
      return data for which corresponding color metadata matches the governing metadata
      return invalidated data when corresponding color metadata is different from the governing metadata, and
      patrol scrub the memory array by:
         walking through memory locations within the memory array,
         comparing color metadata for data stored in the memory locations being walked through with updated governing metadata for the memory locations being walked through to identify invalidated memory locations, and writing invalidated data, updated color metadata, or combinations thereof to memory locations having color metadata that does not match updated governing metadata.

9. The system of claim 8, in which the memory array is non-volatile memory array.

10. The system of claim 8, in which the memory is a volatile memory array.

11. The system of claim 8, further comprising a scrub status indicator to indicate when a patrol scrubber has walked through the memory locations within the memory array.

12. The system of claim 8, in which the patrol scrubber implements an accelerated walk through procedure.

13. The system of claim 8, in which the invalidated data comprises a pattern of bit values that is different from the data.

14. The system of claim 8, wherein the memory manager is to flush memory cache associated with invalidated memory locations.

15. The system of claim 8, wherein the governing data indicates that a memory location of the memory locations is in a cycle in which the memory location is being used by an application.

16. The system of claim 8, wherein the memory manager is to reallocate a memory location for which governing metadata is changed to a different application.

17. A non-transitory machine-readable storage medium storing instructions executable by a processing resource, the non-transitory machine-readable storage medium comprising:

instructions to establish governing metadata for a memory location within a memory array;

instructions to compare color metadata associated with first data stored in the memory locations to the governing metadata, in which the first data corresponds to a request to retrieve the first data;

instructions to return the first data when the color metadata associated with the first data matches the governing metadata;

instructions to invalidate first data whose color metadata is different from the governing metadata; and instructions to patrol scrub the memory array comprising instructions to:

walk through a number of memory locations within the memory array, compare color metadata associated with data stored in the memory locations to the governing metadata, and write invalidated data, updated color metadata, or combinations thereof to memory locations that include data whose color metadata is different from the governing metadata, wherein the updated color metadata matches the governing metadata.

18. The non-transitory machine-readable storage medium of claim 17, in which the governing metadata, the color metadata, or combinations thereof comprise a number of bits set to predetermined values.

19. The non-transitory machine-readable medium of claim 17, further comprising instructions to indicate when a patrol scrub is complete.

20. The non-transitory machine-readable medium of claim 17, further comprising instructions to flush memory cache associated with invalidated memory locations.

* * * * *